United States Patent
Farn

(10) Patent No.: US 6,480,334 B1
(45) Date of Patent: Nov. 12, 2002

(54) AGILE BEAM STEERING USING PHASED-ARRAY-LIKE ELEMENTS

(75) Inventor: Michael Wayne Farn, Burlington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 08/183,505

(22) Filed: Jan. 18, 1994

(51) Int. Cl.$^7$ .................................................. G02B 5/18
(52) U.S. Cl. ........................ 359/575; 359/566; 359/571; 359/573
(58) Field of Search ................................ 359/565, 566, 359/569, 573, 571, 574, 575

(56) References Cited

U.S. PATENT DOCUMENTS

| | | | | |
|---|---|---|---|---|
| 3,482,107 A | * 12/1969 | Hock | ......................... | 359/566 |
| 4,091,281 A | * 5/1978 | Willhelm et al. | ........... | 359/566 |
| 4,435,041 A | * 3/1984 | Torok et al. | ................ | 359/573 |
| 4,585,307 A | 4/1986 | Dammann et al. | .......... | 359/571 |
| 4,679,901 A | 7/1987 | Dammann et al. | .......... | 359/575 |
| 4,776,669 A | * 10/1988 | Dammann et al. | .......... | 359/566 |
| 4,786,124 A | * 11/1988 | Stone et al. | ................. | 359/573 |
| 4,895,790 A | * 1/1990 | Swanson et al. | ............ | 359/573 |
| 4,936,665 A | * 6/1990 | Whitney | ..................... | 359/573 |
| 5,151,814 A | * 9/1992 | Grinberg et al. | ............ | 359/573 |
| 5,161,045 A | 11/1992 | Hutchin | ..................... | 359/197 |
| 5,175,647 A | * 12/1992 | Gupta et al. | ................ | 359/566 |
| 5,218,471 A | * 6/1993 | Swanson et al. | ............ | 359/565 |

OTHER PUBLICATIONS

William Goltsos et al., "Agile Beam Steering Using Binary Optics Microlens Arrays", Optical Engineering, vol. 29, No. 11, Nov. 1990.

Tom D Milster et al., "Modeling and Measurement of a Micro–Optic Beam Deflector", Design, Modeling, and Control of Laser Beam Optics, vol. 1625, 78/SPIE, 1992.

* cited by examiner

Primary Examiner—Cassandra Spyrou
(74) Attorney, Agent, or Firm—Choate, Hall & Stewart

(57) ABSTRACT

Agile steering of a laser beam using a pair of complementary optical elements which are mechanically translated. The elements consist of pixelated steps of varying depth. Structure is provided to steer a laser beam by translating one element with respect to the other element by a distance that is an integer multiple of the step width.

22 Claims, 10 Drawing Sheets

AGILE BEAM STEERING USING PHASED-ARRAY-LIKE ELEMENTS

This invention was made with government support under Contract Number F19628-90-C-0002 awarded by the Air Force. The government has certain rights in the invention.

BACKGROUND OF THE INVENTION

This invention relates to a device for the agile steering of a light beam and more particularly to a complementary pair of mechanically driven phased array-like elements which steer light into a desired diffraction order.

The steering of a collimated laser beam is a fundamental building block for many optical systems. Common examples include bar code scanners, laser radars, laser machining applications and laser printers. Traditionally, this function has been limited to systematic scanning and has been accomplished by mirrors or holographic scanners.

Recent developments in microoptics and particularly in binary optics, however, has led to the possibility of quick non-systematic scanning as binary optics technology is capable of manufacturing large arrays of optically coherent microoptics. The use of a complementary pair of binary optics microlens arrays for agile steering a laser beam was published by Goltsos and Holz in *Opt. Eng.* 29 (1990). A binary optics microlens array, however, has high losses in diffraction efficiency and diffraction leakage into many neighboring orders. The use of a phased grating profile for beam steering also has been disclosed in U.S. Pat. No. 4,585,307. This patent teaches a beam steering device which is one dimensional and has a substantially parabolic grating profile. The problem with having a parabolic grating profile is that in order to steer a beam into higher diffraction orders, the resulting parabolic grating profile must be deep. This deep profile is both difficult to fabricate and has high losses in diffraction efficiency. An alternative to the microlens and the phase grating designs is the phased array-like design of the present invention.

SUMMARY OF THE INVENTION

The invention disclosed herein is a device for agile steering a laser beam using a pair of complementary optics elements which have a phased array-like profile. The phased array-like profile consists of pixelated steps of varying depth, with no step introducing a phase delay of more than one wave. The structure of the present invention can steer a laser beam by translating one element with respect to the other by a distance that is an integer multiple of the step width. The diffraction efficiency of the phased array-like design is a $\text{sinc}^2$ function of the steering angle and the sidelobes are weak in the immediate vicinity of the steered beam, while any strong sidelobes are well separated from the target order.

The phased array-like design of the invention can be fabricated using general binary optics technology. For example, binary optics elements with the phased array-like design were fabricated using a 4 mask process with a minimum feature size of 5 $\mu$m. The device demonstrated agile steering of a 1 cm diameter green HeNe ($\lambda$=0.543 $\mu$m) laser beam over a 6 degree field of view.

DESCRIPTION OF THE PREFERRED EMBODIMENT

The present invention relates to an apparatus for agile beam steering using phased array-like optical elements. For illustrative purposes, steering of the beam is described in a single dimension, and for the case where the pattern of steps is periodic and for collimated light. However, the invention is not restricted to these cases.

Figure 1A:
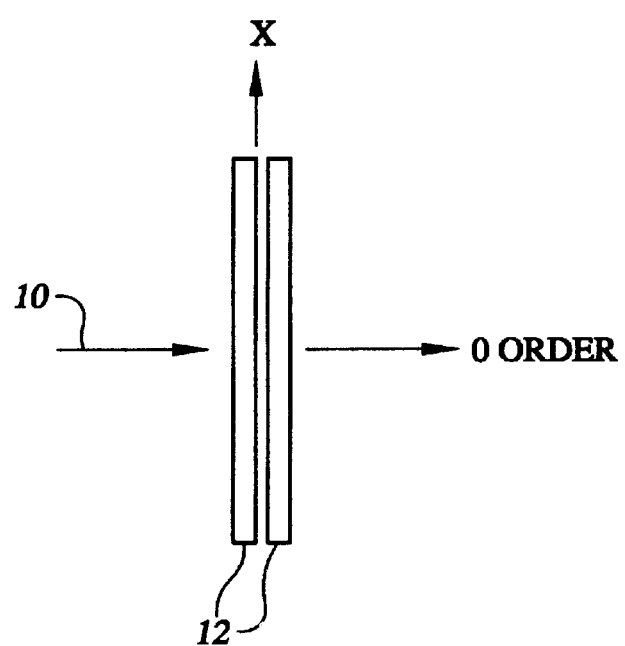
FIGS. 1*a* and 1*b* are schematic diagrams of a pair of binary optics beam steering devices.
Figure 1B:
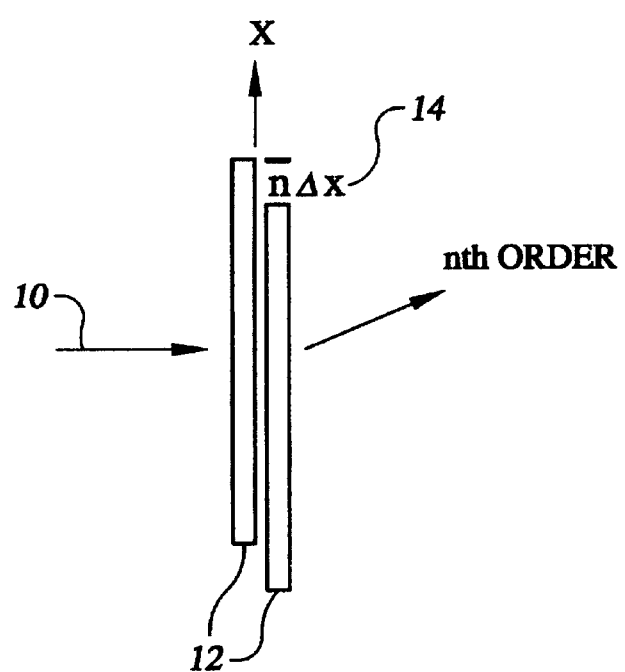

FIGS. 1(*a*) and 1(*b*) show a collimated light beam 10 of wavelength $\lambda$ which is incident on a pair of binary optics elements 12. The elements include a plurality of steps (not shown in FIG. 1) having a step width or size $\Delta x$. $\Delta \theta$ is the addressable angle for the system. The objective in beam steering is to design the elements 12 such that the beam is steered to the 0 order when the elements are aligned with each other, as shown in FIG. 1(*a*), to the +1 order or angle $\Delta \theta$ when the elements are translated by an amount $\Delta x$ with respect to each other, and to the nth order or angle n$\Delta \theta$ when translated by an amount n$\Delta x$ 14 as shown in FIG. 1(*b*). The "effective period" of the device is then d=$\lambda/\Delta \theta$. The "effective" number of steps is N=d/$\Delta x$. For the remainder of this example, for clarity, we will assume N is an even integer. In this case, the structure will be periodic with period d and N will be the actual number of steps per period. However, the device is not limited to this case. An estimate of the field of view is then given by $$\text{FOV} = N\Delta\theta, \qquad (3)$$

since N steps will steer to N different diffraction orders.

The binary optics elements can be modelled as thin phase plates, with the first element introducing a phase delay of $\phi(x)$ which is periodic with period d and the second element introducing a phase delay of $-\phi(x)$.

Given the three degrees of freedom $\lambda$, $\Delta \theta$ and $\Delta x$, the objective is to choose the phase $\phi(x)$ such that the beam can be steered into the nth diffracted order by translating the elements by amount n$\Delta x$ with respect to each other. The phase of the beam after passing through the two elements translated by amount n$\Delta x$ is $\phi(x)-\phi(x+n\Delta x)$. The first term results from the first element of the pair 12 and the second term results from the shifted second element of the pair 12.

The diffraction efficiency into the lth diffracted order of the two elements translated by nΔx is $$\eta(n,l) = \left| \frac{1}{d} \int_{-d/2}^{d/2} \exp[\varphi(x) - \varphi(x+n\Delta x)] \exp[-j2\pi l x/d] dx \right|^2. \quad (4)$$

The goal is to maximize the quantities η(n,l), where l=n; this indicates the strength of the nth diffracted order for two elements shifted by amount nΔx. The quantities η(n,l), where l≠n, indicate the strength of undesirable sidelobe orders.

The present invention relates to optics elements with phased array-like designs that have the following phase profile:

$$\phi_P(x) = \left( \frac{-\pi m^2}{N} \right) \mod(2\pi) \quad (5)$$

for mΔx−Δx/2<x<mΔx+Δx/2, m is an integer, and where mod( ) is the modulo operator. The surface profile is piece-wise flat with a series of pixelated steps, each of which has a phase depth of less than 2π due to the modulo operator. Since the maximum phase depth does not increase with the number of steps, a larger number of steps can be fabricated and therefore, a beam can be steered into higher diffraction orders and the overall diffraction efficiency is also higher than if the invention were based on a phase profile without the modulo operator.

The algorithm used to obtain the phased array design is a variant of the algorithm presented in "New Iterative Algorithm for the Design of Phase-Only Gratings," in SPIE Vol. 1555 Computer and Optically Generated Holographic Optics, 34–42 (1991). Substituting equation 5 into equation 4 yields the diffraction efficiencies for the phased array:

$$\eta_P(n,l) = \begin{cases} \text{sinc}^2(l/N) & \text{if } l = n+mN, \; m \text{ an integer} \\ 0 & \text{else} \end{cases} \quad (6)$$

$$\eta_P(n,n) = \text{sinc}^2(n/N) \quad (7)$$

Equation 6 is the general diffraction efficiency expression, while equation 7 is the efficiency with which a beam can be steered into the nth order.

EXAMPLE

For illustrative purposes, the properties of the phased array-like device of the invention is compared to the properties of a microlens device. A binary optics device with the phased array-like design of the invention for steering a green HeNe laser beam was designed with the following parameters: design wavelength λ=0.543 μm, angular separation Δθ=4.53 mrad and step size Δx=5 μm. From these parameters, period d=120 μm, number of steps N=24, focal length f=1105 μm and field of view FOV=108 mrad (about 6 degrees) were calculated.

Figure 2:
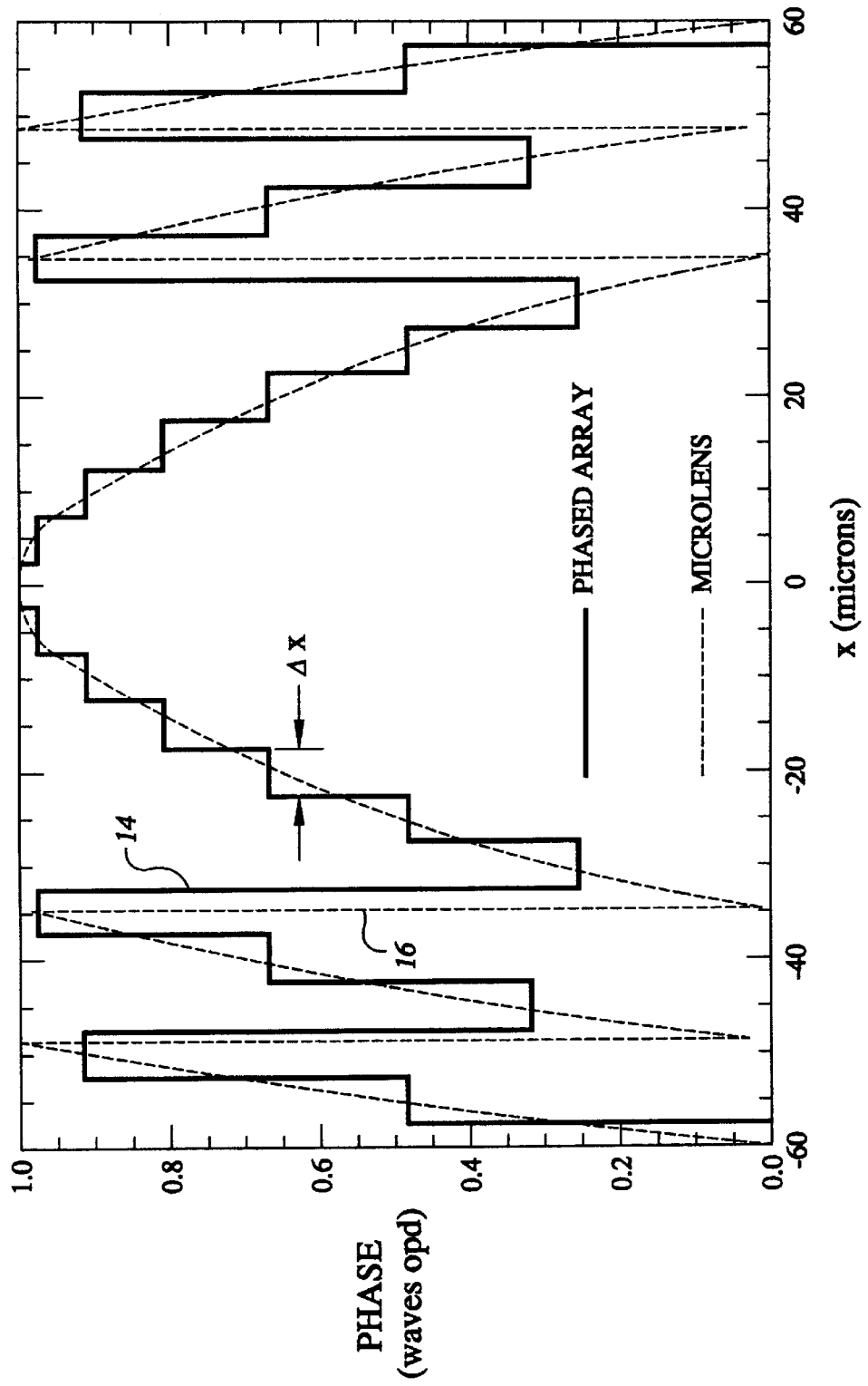
FIG. 2 is a graph of phase profiles of the phased array and the microlens design for one period.

FIG. 2 shows one period of the phase profile for the phased array-like design in a solid line 14 and for a microlens design in a dotted line 16. The lens design has a continuous profile which is repeated with period d. In contrast, the phased array-like design is piece-wise flat with each step having width Δx. In fact, for the special case where N is an even integer, the phased array-like design can be derived from the lens design as follows. Sample the lens design at intervals of Δx. These sample values are then the phases for each step of the phased array-like structure. Graphically, this is illustrated in FIG. 2 by the fact that the phased array-like design and lens design intersect in the center of each phase step. Alternatively, the phased array-like design can be thought of as a sample and hold version of the lens design.

Figure 3:
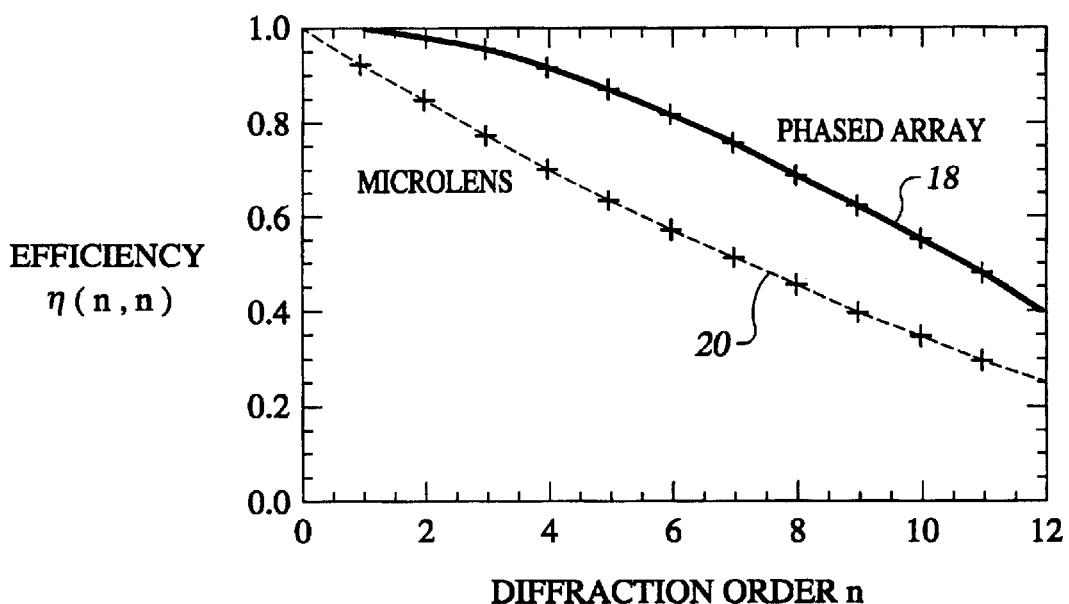
FIG. 3 is a graph illustrating diffraction efficiency of the phased array-like design and the microlens design.
Figure 4A:
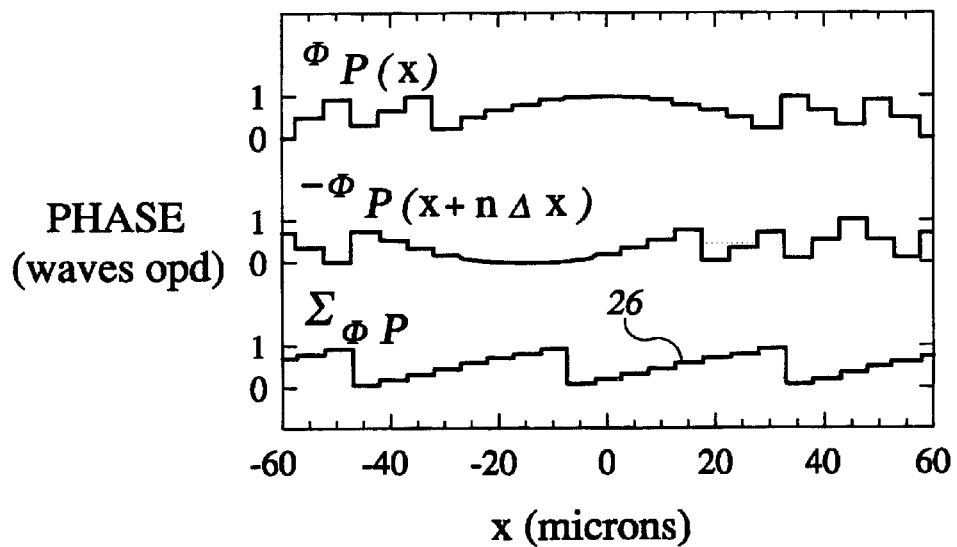
FIGS. 4*a* and 4*b* are graphs of phase profiles of individual and combined elements for a) the phased array-like design and b) the microlens design. Note the discontinuous Y-axis.
Figure 4B:
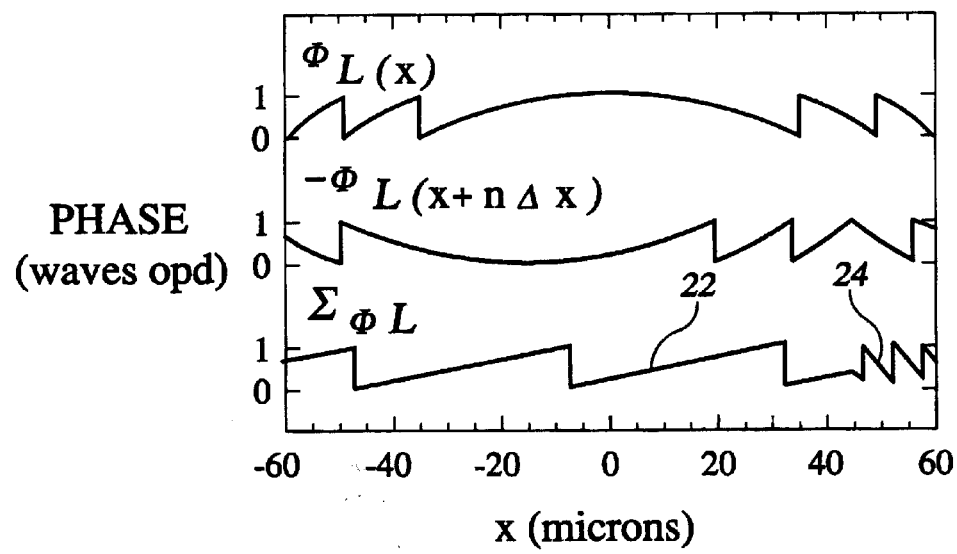

Although the phased array-like design is thought of as a "coarse" step-wise approximation to the lens design, it has better diffraction efficiency. FIG. 3 shows the efficiency, η(n,n) with which each design can steer a beam into a desired diffraction order n. For example, n=3 corresponds to the efficiency into the +3 order when the plates have been translated by an amount 3Δx. The phased array design shown by solid line 18 performs better than the lens design shown by dotted line 20 at all diffraction orders. FIGS. 4(a) and 4(b) explain this phenomenon. In these figures, φ(x) represents the phase delay of the first element of a complementary pair, −φ(x+nΔx) represents the phase delay of the translated second element of the pair and Σφ corresponds to the resultant phase after light has propagated through both elements. In the microlens case as shown in FIG. 4(b), the left side of the exiting phase front Σφ 22 is perfectly blazed for the desired orders ranging from approximately −60 μm to +45 μm. The right side 24, ranging from 45 μm to 60 μm is also perfectly blazed but for the wrong order. In other words, the lens design results in a perfect blaze but an underfilled aperture. The underfilled aperture problem can be improved by implementing complex designs but at the expense of additional layers of microoptics.

In the phased array case of FIG. 4(a), the resultant phase Σφ is a sample and hold version of the lens case. The exiting phase front 26 results in an imperfect blaze due to a staircase approximation but has a completely filled aperture. Hence the efficiency should have a sinc² response as verified in equation 7. This design is called the phased array-like design as each step introduces a constant phase delay and it is the sum contribution of all the steps which steer the beam as is the case in a phased array radar.

Figure 5A:
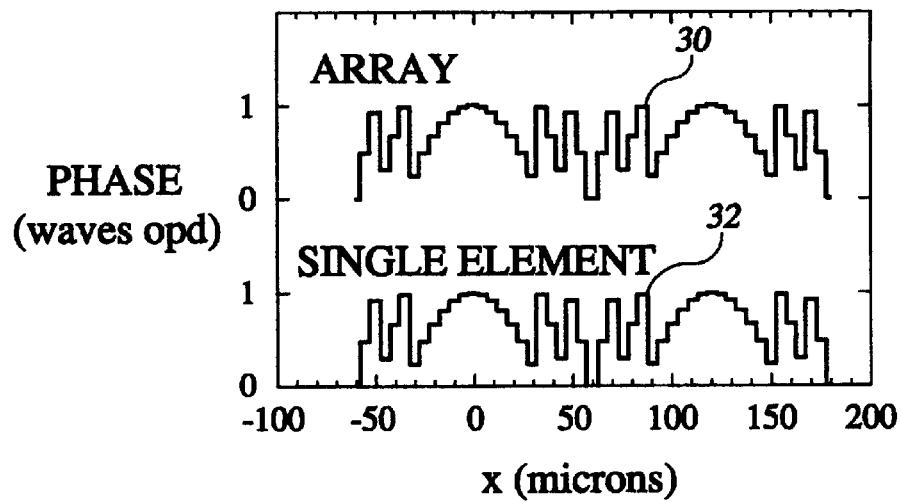
FIGS. 5*a* and 5*b* are graphs of phase profiles for a single cell and multiple cells for a) the phased array-like design and b) the microlens design. Note the discontinuous Y-axis.
Figure 5B:
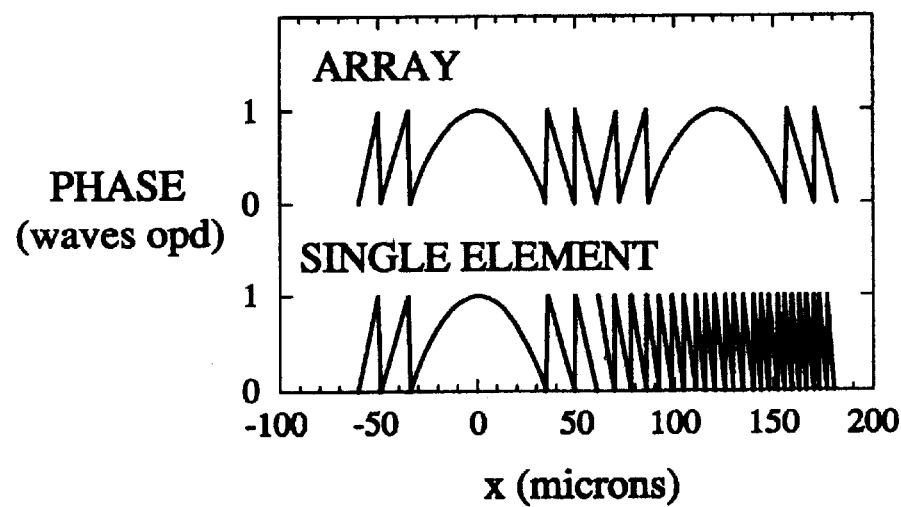

An alternative explanation is shown in FIGS. 5(a) and 5(b). When the second element is translated in the microlens case, the lenses on the first element are no longer perfectly aligned with their complementary lenses in the second element. Instead, each lens overlaps slightly with the neighboring complementary lens. This causes an efficiency loss because the neighboring complementary lens does not behave as a continuation of the original complementary lens as shown in FIG. 5(b). In the region between −60 μm<x<60 μm, profiles of a single lens and of the microlens array are the same, but for regions between 60 μm<x<180 μm, the two profiles are not equivalent. In the phased array-like design, this problem does not occur as one period of the phased array does behave like a continuation of its neighbor. As shown in FIG. 5(a), the phase profile produced by continuing a single element 32 and that produced by arraying the element 30 are equivalent. Mathematically, $$\exp[j\phi_P(x)] = \exp[j\phi_P(x+d)] \quad (10)$$

Figure 6A:
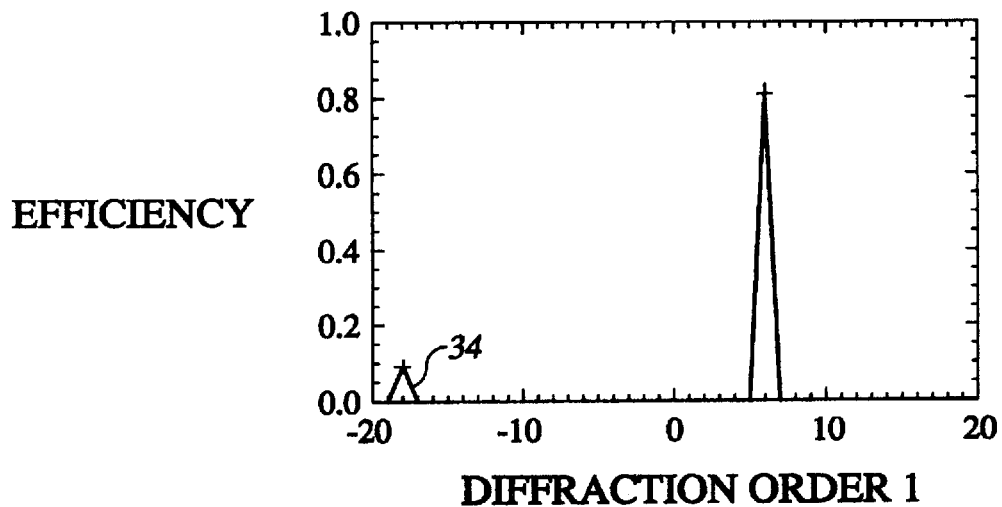
FIGS. 6*a* and 6*b* are graphs of calculated diffraction efficiency of sidelobe orders for a) the phase array-like design and b) the microlens design.
Figure 6B:
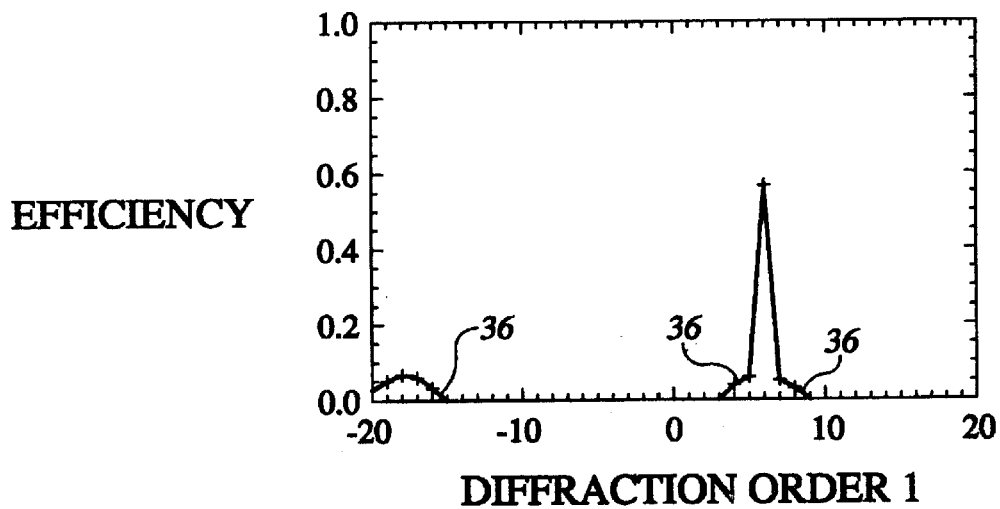
Figure 7B:
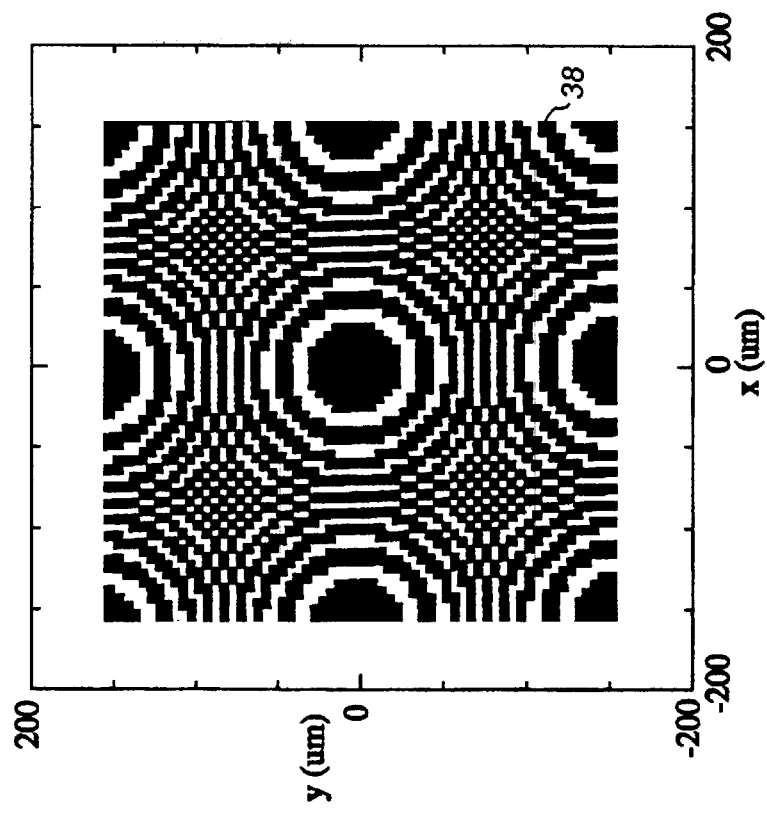
FIGS. 7*a*, 7*b*, 7*c* and 7*d* illustrate 4 mask layers to be used in the construction of the phased-array-like design.
Figure 7A:
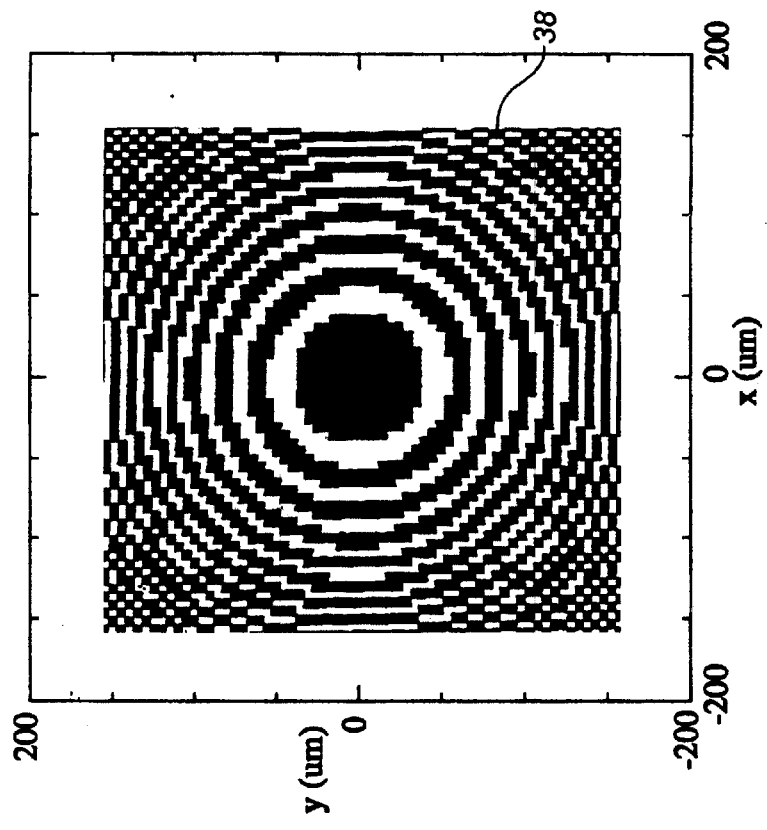
Figure 7D:
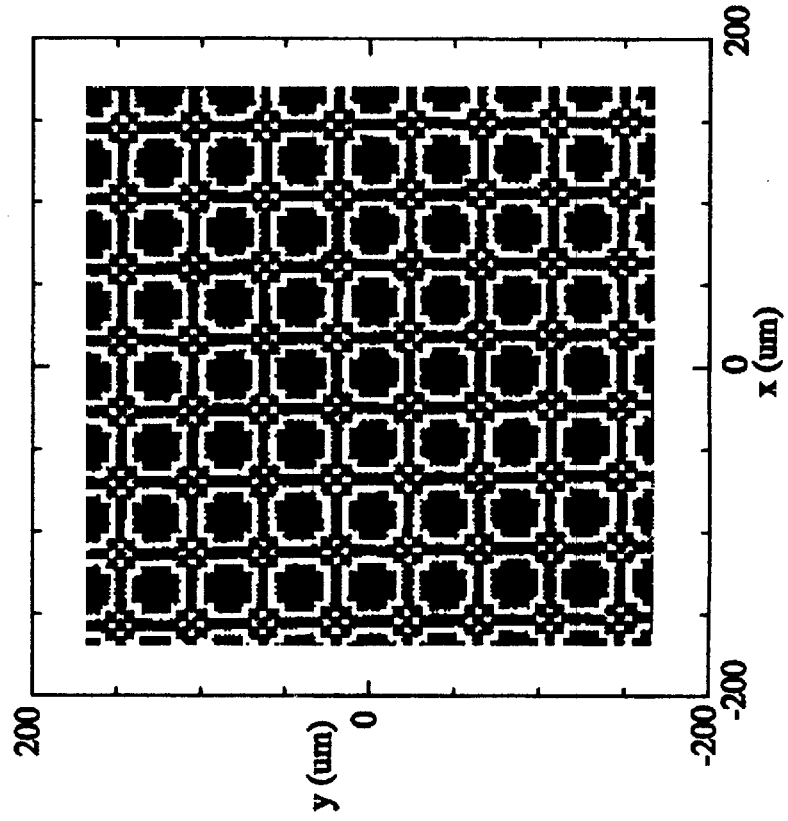
Figure 7C:
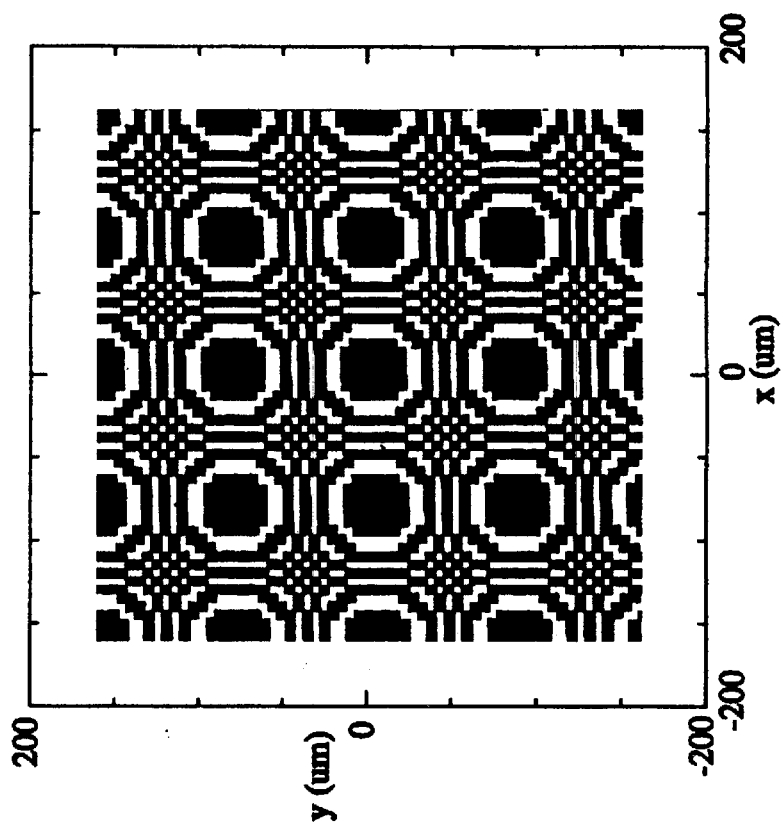

Sidelobe orders refer to non target orders with some amount of diffraction. FIGS. 6(a) and 6(b) show the strength of sidelobe diffraction orders for a target order n=6. The leakage in the phased array design 34 (FIG. 6(a)), although relatively strong, is confined to a small number of orders which are far away from the target order. The lens design (FIG. 6(b)), on the other hand, has leakage into many neighboring orders 36 but they are relatively weak.

EXPERIMENT

To verify theoretically determined properties of the phased array-like design, binary optics elements with the phased array-like design were fabricated on a 2 inch diameter, 1 mm thick quartz substrate to steer a green HeNe laser beam in two dimensions. The wavelength $\lambda=0.543$ μm, step size $\Delta x=5$ μm, and $\Delta\theta=1.7$ mrad. The device region consisted of a 75×50 array of the basic 320 μm×320 μm cell, for a total size of 24 mm×16 mm. A standard binary optics process based on contact lithography and reactive ion etching was used to fabricate the device. The phased array-like device was quantized to 16 phase levels with a minimum feature size of 5 μm. FIGS. 7(a)–7(d) show four masks used for the fabrication. Although these masks show square steps 38, the invention is not limited to that shape. For example, parallel grooved steps may be used to steer a beam along one axis, square or rectangular steps may be used to steer a beam along two axes and hexagonal steps may be used to steer a beam along three axes. The optical path difference produced by the variations in step heights may also be produced by variations in the index of the substrate material. Such a device can be fabricated using photolithography and diffusion.

Figure 8A:
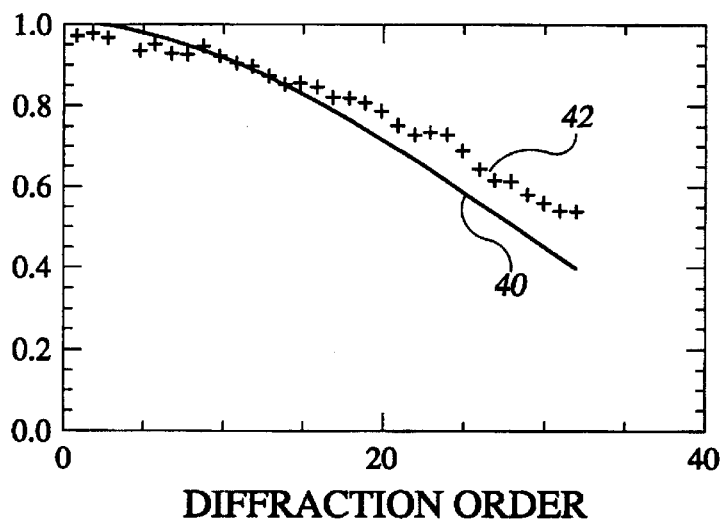
FIGS. 8*a* and 8*b* are graphs of measured normalized beam steering efficiencies for a) the phased array-like design and b) the microlens design.
Figure 8B:
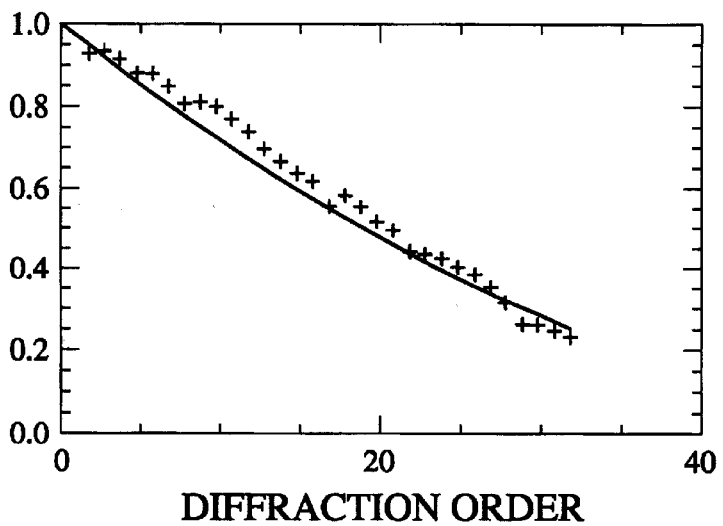

The diffraction efficiency of the fabricated device is shown in FIGS. 8(a) and 8(b). The solid line 40 is the theoretical prediction and the +'s 42 are the experimental results. The current invention (FIG. 8(a)) is significantly more efficient than the microlens technique (FIG. 8(b)). The measurements in FIG. 8 agree quite well with the theoretical predictions, but some of the measurements are above the theoretical values because the efficiencies have been normalized by the 0 order efficiency. The diffraction efficiency into the 0 order was about 60%. 40% loss resulted from the following. First, the simple theoretical model assumes that the optics elements introduce a piece-wise flat phase delay onto the plane wavefront. In reality, each element does not introduce a perfectly piece-wise flat phase delay due to the finite thickness of the elements. The wavefront is additionally degraded as it propagates between the two elements. Second, other reasons for the loss are from the usual fabrication imperfections.

Figure 9A:
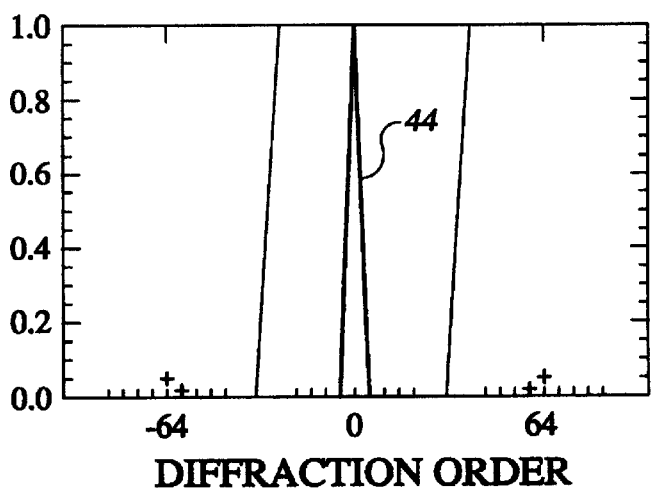
FIGS. 9*a*, 9*b* and 9*c* present measured sidelobe diffraction efficiencies for the phased array-like design with the light steered into a) the 0 order b) the +16 order and c) the +32 order.
Figure 9B:
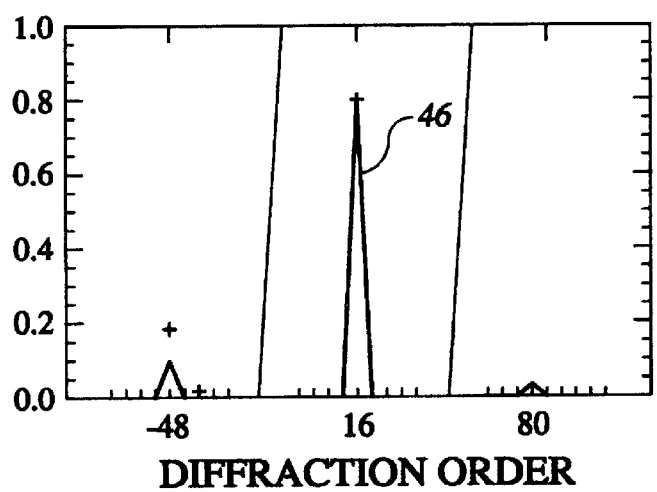
Figure 9C:
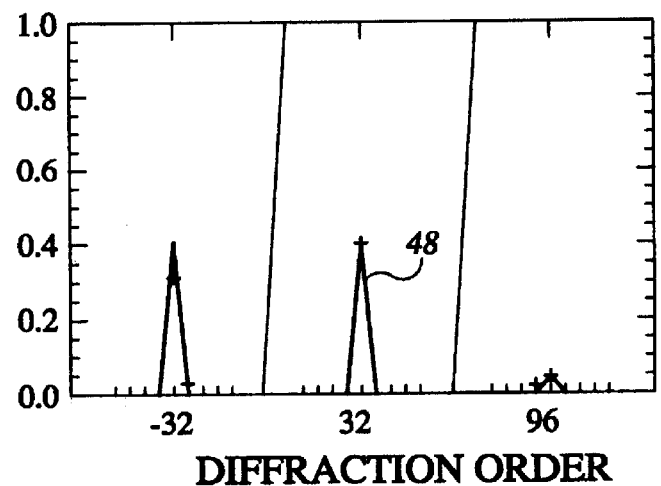

The diffraction intensities in all of the strong sidelobe orders are shown in FIG. 9. The theoretical values are shown in solid lines and the experimental results are shown as +'s. The beam is steered into the 0 order 44 in FIG. 9a), into the +16 order 46 in FIG. 9b) and into the +32 order 48 in FIG. 9c). Again, the experimental results match the theoretical predictions quite well. All figures show that the immediate sidelobes are weak but the distant sidelobes are stronger. Because the energy in the phase array-like design is tightly concentrated, most of the energy ends up in the correct target order; however, when the energy leaks into distant sidelobes, that energy is concentrated in one diffraction order, yielding a strong single sidelobe order.

Although the current invention has been described in terms of optical elements consisting of an array of cells, it is to be understood that elements with a single cell can also be used for beam steering with the same principle. It is also to be understood that steering of HeNe light was for demonstrative purposes and that the present invention can steer any light beam into a desired diffraction order. It is recognized that modifications and variations of the present invention may occur to those skilled in the art, and it is intended that all such modifications and variations be included within the scope of the appended claims.

What is claimed is:

1. Optical apparatus for agile steering of a light beam comprising:

a complementary pair of first and second optical elements, each of the elements including a phased-array-like profile of pixelated steps with no step introducing a phase delay greater than one wave; and structure to position the elements to face each other in close proximity and to translate one element with respect to the other element by a distance equal to an integer multiple of the width of the pixelated step.

2. The device of claim 1 wherein the phased-array-like profile is piecewise flat.

3. The device of claim 1 wherein, said beam is steered to the 0 order when said elements are aligned with each other.

4. The device of claim 1 wherein, said beam is steered into the nth order when said elements are translated by an amount $n\Delta x$, where $\Delta x$ is the step width.

5. The device of claim 1 wherein, said first element introduces a phase delay of $\phi(x)$, and said second element introduces a phase delay of $-\phi(x+n\Delta x)$ when shifted by amount $\Delta x$.

6. The device of claim 5 wherein, the phased-array-like profile is $\phi_P(x)=(-\pi m^2/N)\mod 2\pi$ for $m\Delta x-\Delta x/2<x$ $m\Delta x+\Delta x/2$, where m is an integer.

7. The device of claim 6 wherein, said phased-array-like profile results in an imperfect blaze but a completely filled aperture.

8. The device of claim 1 wherein general diffraction efficiency is $\text{sinc}^2(l/N)$ if $l=N+mN$ and m is an integer and 0 otherwise, where l is any diffraction order, $n\Delta x$ is the amount the first optical element is translated with the respect to the second optical element and N is the number of steps in one dimension of a cell.

9. The device of claim 1 wherein, the efficiency with which said beam is steered into the nth order is $\eta_P(n,n)=\text{sinc}^2(n/N)$, where n is the target diffraction order and N is the number of steps in one dimension of a cell.

10. The device of claim 1 wherein, sidelobe diffractions are confined to a small number of orders which are far away from the target order.

11. The device of claim 1 wherein each element consists of one cell.

12. The device of claim 1 wherein each element consists of an array of cells.

13. The device of claim 1 wherein the phased-array-like profile produced by a single cell and that produced by multiple cells always differ by an integer multiple of waves such that said phased-array-like profiles are equivalent.

14. The device of claim 1 wherein said phased-array-like profile consists of parallel grooved steps whereby said beam is steered in a direction perpendicular to the edges of the steps.

15. The device of claim 1 wherein said phased-array-like profile consists of square or rectangular steps whereby said beam is steered in two directions perpendicular to the edges of the steps.

16. The device of claim 14 or 15 wherein a phase delay of each step is caused by variations in physical height.

17. The device of claim 1 wherein, said elements are fabricated on quartz substrates.

18. The device of claim 1 wherein, said elements are fabricated with four binary masks.

19. The device of claim 1 wherein, said elements are quantized to 16 phase levels with a minimum feature size of 5.0 μm.

20. An optical device for agile steering a light beam comprising a complementary pair of binary optics elements with phased array profiles, the first element having a planar surface with one or more steps with each step introducing a phase delay of not more than one wave, the second element being identical to the first element but each step having phase delay opposite of said delay of the complementary step in the first element, wherein said elements with the profiled surfaces positioned to face each other in close proximity and mechanically translated in the direction parallel to any side of the elements by a distance that is an integer multiple of the step width, thus diffracting the incoming light beam into any diffraction order.

21. The device of claim 20 wherein, said elements are fabricated with contact lithography and diffusion.

22. The device of claim 20 wherein, said elements are stripes, squares, rectangles or hexagons.

* * * * *